UNITED STATES PATENT OFFICE.

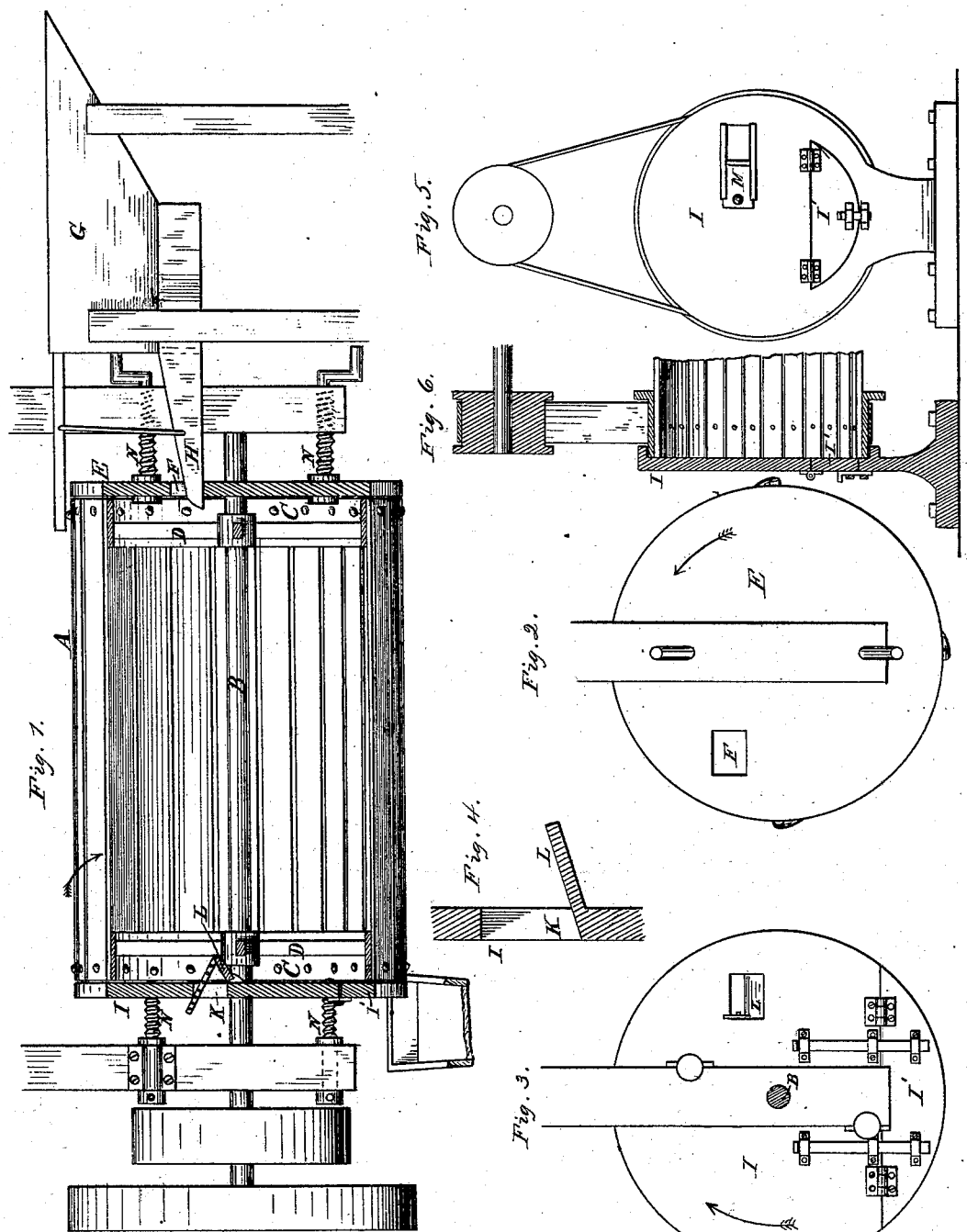

BENJAMIN F. WALTERS, OF NORFOLK, VIRGINIA.

APPARATUS FOR CLEANING AND SCOURING PEANUTS, &c.

SPECIFICATION forming part of Letters Patent No. 224,810, dated February 24, 1880.

Application filed December 1, 1879.

*To all whom it may concern:*

Be it known that I, BENJAMIN F. WALTERS, of Norfolk, in the county of Norfolk and State of Virginia, have invented certain new and useful Improvements in Rotary Cleaners; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to an improved construction of the rotating cylinders or screens which are used for separating dirt and other foreign matter from nuts, grain, &c., and also for polishing and improving the appearance and quality of the material to be cleansed, my improvements being especially applicable to the rotating cylinders or screens which are used in cleaning peanuts and preparing them for market.

Heretofore in the cleaning of these articles it has been customary to compel the nuts to pass through a revolving cylinder, and afterward subject them to various fanning, screening, and separating operations.

The cylinders that have been used for this purpose have generally been either mounted upon a central shaft, or have been suspended in and rotated by supporting-belts, each cylinder having at the feed end and at the discharge end inwardly-turned flanges attached to and rotating with the cylinder. The end flanges have been constructed and arranged to leave large central openings, through which the nuts are, respectively, fed and discharged; but the cylinders thus constructed with rotating heads have been found defective in that the large central openings will not permit the cylinder to retain the nuts in large enough quantities or for a time long enough to thoroughly effect the separation and removal of the dirt; and they have been further found inconvenient and defective in that it is impossible to cause the cylinders to completely empty themselves automatically, it being necessary often to entirely empty them—as, for instance, when it is desired to pass another grade or quality of material through the cylinders, or when it is desired to obtain access to the cylinders for cleansing or repairing the same.

Heretofore, in order to empty the cylinders entirely, it has been necessary to stop them and rake out the lodged materials, or otherwise remove them by hand.

My invention has for its object the avoidance of these defects by so constructing the machine that the nuts can accumulate in large enough quantities, and be retained long enough to be thoroughly cleaned and polished, and that the cylinders at any time can be caused to empty themselves automatically and discharge all their contents, and that ready access may be had at any time to the interior of the cylinders.

To these ends it consists, first, in combining, with a rotating cylinder which is fed and discharged automatically through the ends, stationary heads which entirely close the feed end and the discharge end of the cylinder, except at one point in each head, where there are small openings between the periphery and the axis of the cylinder for the feed and for the discharge.

The invention consists, secondly, in combining, with a cylinder constructed and operating as aforesaid, two stationary heads provided with small apertures between the periphery and the axis of the cylinder for feeding and discharging, respectively, which apertures are situated on the side of the axis of the cylinder opposite to the side on which the nuts are being elevated.

The invention consists, thirdly, in combining, with a cylinder constructed and operating as aforesaid, two heads which may partially or entirely close the respective ends of the cylinder, and which are arranged to be reciprocated toward and from the cylinder.

The invention consists, fourthly, in combining, with the cylinder constructed and operating as aforesaid, a non-rotating head for the discharge end, the whole or part of which may be readily removed from proximity to the cylinder for rapidly emptying the same.

The invention consists, further, in detail improvements, to be hereinafter set forth.

The cylinder may be mounted upon a central shaft, or be suspended in belts, or be supported on rollers; or it may be mounted and operated in any other convenient or desired manner; and the cylinder may be supplied by any of the well-known feeding devices, these matters forming no part of the present invention.

In the drawings I have shown some of the ways of carrying out my invention.

Figure 1 is a sectional view of a cylinder containing my improvements. Fig. 2 is a view of the feed end. Fig. 3 is a view of the discharge end. Fig. 4 is a view of a portion of a discharge-head having a discharge-shelf cast in one piece therewith, and Fig. 5 is an end view of a head when applied to a cylinder suspended in belts. Fig. 6 is a vertical section of the devices shown in Fig. 5.

In the construction shown the cylinder A is mounted on a central shaft, B. This shaft may be mounted in brackets depending from the ceiling or standards resting upon the floor.

The wall of the cylinder may be made of reticulated material, as wire-cloth, or of slats, the latter being preferable in cylinders for cleaning nuts. When slats are employed they are held in place by being fastened to rings or bands C C at the ends of the cylinder. These rings or bands are connected to the central shaft, B, by means of spokes or radial arms D D of any suitable number.

In order to compel the material to gradually pass through the cylinder it may be inclined slightly, or, preferably, it may be provided with lifting-ribs arranged in spiral or inclined positions, so as to slowly force the nuts toward the discharge end.

E represents a non-rotating head situated at the end of the cylinder, where the nuts are fed into it. This head may be formed of any convenient material, either sheet metal or cast.

F is an aperture in the head E, through which the nuts are fed to the cylinder by means of a hopper, G, and spout H, or by any preferred feed devices. This opening F is situated on the side of the axis of the cylinder opposite to the side upon which the nuts are elevated, in order to prevent accidental escape of the nuts at the feed end.

When the cylinder is in operation it is rotated in the direction of the arrow, and the nuts (by means of the lifting-ribs and of the momentum received from the cylinder) are carried up to and beyond the central vertical plane of the cylinder in a constant stream; and in order to retain a large mass of nuts within the cylinder and prevent their escaping at the aperture F it is necessary that said aperture should be situated at some distance away from the path of the falling nuts—that is to say, between the axis and the side where the slats and ribs descend.

I is a non-rotating head at the discharge end of the cylinder, which may be constructed substantially similar to the head E. K represents a discharge-opening in the head I, said opening being situated analogously to the feed-opening F.

L is a small chute or shelf adapted to catch the falling nuts and guide them to the opening K. This shelf or chute may be horizontal or inclined, and may be rigidly attached to or cast with the head I, (see Fig. 4;) or it may be adjustably attached to the head, so as to be adapted to regulate the discharge. (See Fig. 1.)

From an examination of the drawings it will be seen that when the cylinder and heads are constructed in the manner described the nuts will not escape from the aperture K until the cylinder is filled to the height of said aperture, and by this means the nuts can be accumulated in the cylinder to an amount many times greater than they can in the open-ended cylinders ordinarily employed, and this greater accumulation results in a more thorough cleansing and polishing.

The heads E and I may, if desired, be made permanently stationary in place by bolting them to the brackets or standards in which the shaft B is mounted, or by screwing them to the floor or to some other fixed part of the structure; but in order to attain very important advantages I mount the heads in the manner shown—that is, they are supported in such way that when it is desired to compel the nuts to escape from the aperture K the discharge-head can be moved and held close to the end of the cylinder; but when it is desired to rapidly empty the cylinder the head I can be readily withdrawn far enough to permit the nuts to escape below the lower edge of the head and from the bottom of the cylinder, and so that when it is desired to obtain access to the interior of the cylinder for cleansing or repairing the same either or both of the heads may be withdrawn for such purpose.

The heads are shown as supported upon screws N, passing through the shaft-support, which screws can be caused to move the heads to and from the cylinder, as may be desired.

The discharge-head I may be constructed in two parts, if desired, the lower part, I', of which may be readily detached from the upper part, so as to leave the cylinder open at the bottom for rapidly emptying the same. The lower part, I', may be connected with the upper part in any desired way, as by "ways," permitting said part I' to slide to and from its place, or by hinges, or by any other preferred means of connection.

M represents a slide or door wherewith the aperture K may be partly or entirely closed, though I have found the discharge can be sufficiently regulated by means of the feeding devices.

I find it sometimes advantageous to mount the cylinder A loosely upon the shaft B, in order that the shaft may serve as a support for ropes or pieces of other similar rough material. The ropes are tied to the shaft at one end, and are permitted to drag through the nuts, and they greatly assist in cleansing and polishing the same and in breaking off roots and stems.

In Fig. 5 I have shown my improved head as adapted to be applied to a cylinder supported in belts. In this the head is cast with a standard, whereby it can be rigidly attached to the floor.

What I claim is—

1. The combination, with a rotating cylinder which is fed through one end and emptied through the opposite end, of the non-rotating heads arranged to close the ends of the rotating cylinder, through which non-rotating heads the material passes, respectively, to the interior of and from the cylinder while it is rotating, substantially as set forth.

2. The combination, with an end-feeding and end-discharging rotary cleaning-cylinder, of a non-rotating head, of which the whole or a part can be moved to and from the end of the cylinder to permit the rapid emptying of the same, substantially as set forth.

3. The combination, with an end-feeding and end-discharging rotary cleaning-cylinder, of a stationary head arranged to close the end at which the cylinder is fed, and provided with a feed-opening between the axis and the periphery of the cylinder on the side opposite to that where the nuts are elevated, and a stationary head arranged to close the discharge end of the cylinder, and provided with a discharge-opening between the axis and the periphery of the cylinder on the side opposite to that where the nuts are elevated, substantially as set forth.

4. The combination, with a rotary cleaning-cylinder, a non-rotating head at one end of the cylinder, through which the material is fed, and a non-rotating head at the opposite end of the cylinder, through which the material is discharged, of an inwardly-projecting spout or shelf supported upon the non-rotating discharge-head, substantially as set forth.

5. The combination, with a rotary cleaning-cylinder into and from which the material passes through the respective ends, of non-rotating heads of which one is provided with a feed-opening and the other with a discharge-opening, both of which openings are located between the circumference of the cylinder and the axis of its rotation, whereby a cleansing is effected by a mutual attrition by the particles of the material, substantially as set forth.

6. The combination, with a rotary cleaning-cylinder, of a non-rotating discharge-head constructed in two parts, of which one can be removed from proximity to the cylinder independently of the other, substantially as set forth.

7. The combination, with a rotary cleaning-cylinder and a non-rotating head, of the screws N N, substantially as set forth.

In testimony that I claim the foregoing I have hereunto set my hand.

B. F. WALTERS.

Witnesses:
GEORGE LOYALL,
JOSEPH ROLLAND.